United States Patent [19]

Burton et al.

[11] Patent Number: 5,581,743
[45] Date of Patent: Dec. 3, 1996

[54] CKD TO FIXED BLOCK MAPPING FOR OPTIMUM PERFORMANCE AND SPACE UTILIZATION

[75] Inventors: David A. Burton; Robert L. Morton, both of Tucson, Ariz.

[73] Assignee: International Business Machines Corporation, Armonk, N.Y.

[21] Appl. No.: 411,068

[22] Filed: Mar. 27, 1995

Related U.S. Application Data

[63] Continuation of Ser. No. 173,039, Dec. 27, 1993, abandoned.

[51] Int. Cl.$^6$ ...................................................... G11B 5/00
[52] U.S. Cl. .................... 395/500; 395/439; 364/DIG. I; 364/DIG. II
[58] Field of Search ................................. 395/425, 439, 395/375, 260.6, 500

[56] References Cited

U.S. PATENT DOCUMENTS

| | | |
|---|---|---|
| 4,223,390 | 9/1980 | Bowers et al. . |
| 4,531,163 | 7/1985 | Maerkl et al. . |
| 5,157,770 | 10/1992 | Beardsley et al. . |
| 5,200,864 | 4/1993 | Dunn et al. . |
| 5,202,799 | 4/1993 | Hetzler et al. . |
| 5,206,939 | 4/1993 | Yanai et al. . |
| 5,210,660 | 5/1993 | Hetzler . |
| 5,247,638 | 9/1993 | O'Brien et al. ........................ 395/888 |
| 5,274,772 | 12/1993 | Dunn et al. .............................. 395/275 |
| 5,285,327 | 2/1994 | Hetzler ...................................... 360/48 |
| 5,301,304 | 4/1994 | Menon ...................................... 395/500 |
| 5,388,013 | 2/1995 | Nakamura ................................ 360/48 |
| 5,394,534 | 2/1995 | Kulakowski et al. ................... 395/425 |
| 5,414,570 | 5/1995 | Fry et al. .................................. 360/48 |
| 5,440,474 | 8/1995 | Hetzler .................................... 360/135 |
| 5,455,926 | 10/1995 | Keele et al. ............................. 395/404 |
| 5,459,853 | 10/1995 | Best et al. ................................ 395/441 |
| 5,465,382 | 11/1995 | Day, III et al. ......................... 395/404 |

OTHER PUBLICATIONS

IBM Systems Journal, Role of the DASD storage control in an Enterprise Systems, by Grossman, pp. 123(24), 1992.

*Primary Examiner*—William M. Treat
*Assistant Examiner*—Zarni Maung
*Attorney, Agent, or Firm*—Floyd E. Anderson; Robert M. Sullivan

[57] ABSTRACT

Count-key-data records are mapped to a fixed-block architecture storage device using a fuzzing packing method that packs some count-key-data records while writing other count-key-data records at a beginning of a next available sector (unpacked) according to the size of the count-key-data record, the size of the sector, and the location of the next available byte for writing data in the current sector. If the number of sectors required to write the current record starting at the next available byte location in the current sector, is greater than a minimum number of sectors to write that same record if that record were written at the beginning of the next available sector, then the record is written unpacked, otherwise the record is packed.

4 Claims, 3 Drawing Sheets

CKD TO FIXED BLOCK MAPPING FOR OPTIMUM PERFORMANCE AND SPACE UTILIZATION

This is a continuation of U.S. application Ser. No. 08/173,039, filed Dec. 27, 1993, now abandoned.

FIELD OF THE INVENTION

The present invention relates generally to data storage systems, and more particularly, to a data storage system and method for mapping count-key-data (CKD) records to a data medium characterized by a fixed-block architecture (FBA).

BACKGROUND OF THE INVENTION

Providing an ability to store large amounts of data (or records), which data can be quickly accessed, modified, and re-stored, is typically a mandatory requirement for large, intermediate and even small computing systems. These computing systems, for example, take the form of a host processor, such as an IBM System/360 or IBM System/370 processor for computing and manipulating data, attached to an IBM 3990 storage controller, which is further connected to a group of direct access storage devices (DASDs) such as IBM 3380 or 3390 DASDs. While the host processor provides substantial computing power, the storage controller provides the necessary functions to efficiently transfer, stage/destage, convert and generally access large databases. These databases, as stored on DASDs, for example, can easily exceed several gigabytes of data.

DASD storage, for example, magnetic or optical disks, stores bits of data as micrometer sized magnetic or optical altered spots on a disk surface for representing the "ones" and "zeros" that make up those bits of the data. Magnetic DASD, includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA), typically includes one or more read/write heads, and is provided in each DASD for moving across the tracks to transfer the data to and from the surface of the disks as the disks are rotated past the read/write heads.

Data or records are generally stored in DASD in count-key-data (CKD) format or in fixed-block architecture (FBA) format. CKD record storage is desirable because the records are stored efficiently, that is, wasted disk space is minimized. Records stored in the CKD format include a count area, a key area, and a data area. The count area is typically an n-byte field that identifies the record by describing the physical address (track number), an identifier (including a cylinder number, a head number, and a record number), a record format, and the length of the record (how many bytes of data make up the record, and a key length (how many bytes make up the following key area). The key area can be many bytes long, for example from one to 256 bytes, for uniquely identifying the record. The key could be a part number, employee identification number, an account number or other useful identifier. The data area is the actual data and can vary from a few bytes to millions of bytes. CKD records, in addition to efficient storage, conveniently provide an ability to find a record based upon the key. Also, because the CKD record length is defined and known, the CKD record can be written contiguously, with another record written at the end of the previous record without wasting disk space between records. A drawback to the CKD record format is that an entire track may need to be searched to find the key for accessing the record.

Storing data in the FBA format requires using a DASD especially formatted for such storage. FBA record storage advantageously provides simpler processing and faster access at a reduced storage efficiency cost. Furthermore, FBA type DASDs are available at lower cost. DASDs having FBA record storage capability divide the tracks into many sectors, with each sector having a predetermined number of bytes. As an example, each track might be divided into seventy two sectors, with each sector capable of storing 512 bytes of data. Each sector provides both location or address identification and data storage. In the current example, if a record contains less than 512 bytes, then the area in the sector following the data is unused and typically padded (filled to the end with "zeros").

FBA type devices generally offer better performance than the CKD type devices. Additionally, FBA type devices are widely available offering small form factor packaging with storage capacities exceeding one gigabytes. Due to the proliferation of FBA devices, not surprisingly, users desire to store previously written CKD records in the FBA format. Writing a CKD record to an FBA device requires mapping the CKD record and sometimes converting the CKD record format. Several different conversion techniques are known for modifying such CKD records formats.

One method of converting CKD records into FBA records involves placing each area of the CKD record into separate sectors. Thus, the count field is written to a first sector, the key field is written to a second sector, and the data field is written to one or more additional sectors. The efficiency of this conversion format is dependent upon both the size of the records and the size of the sectors. The worst case scenario occurs with small records and large sectors, where substantial disk space is wasted in unused areas of the sectors in the count and key fields, as well as unused area in the data fields. On the other hand, this conversion may be quite efficient for cases of smaller sector sizes coupled with generally large data fields since the overhead of sectors for count and key fields is minimized. Writing CKD records to FBA devices in this manner is very fast since additional mapping computations are minimal.

Another method for providing CKD record to FBA record conversion involves packing the CKD records. In this conversion method, a first CKD record is written to the FBA device contiguously (the count, key and data areas are not separated by sector boundaries). The second CKD record is written starting where the first CKD record finished, which location could be in the middle of a sector. Writing CKD records in this manner provides excellent packing density. Larger sector sizes, however, tends to degrade system performance since data must be read starting from the beginning of a sector and much of that data may be of the record preceding the desired record.

Approaching the CKD record mapping problem from another perspective involves storing the CKD records in an unpacked format. In the unpacked format, system performance is excellent but packing density suffers. Each CKD record is written starting at a sector boundary and continues for as many sectors as needed. Hence, records can be found quickly without reading unwanted data. The space from the end of each record to the end of the last sector is padded and hence wasted. The wasted space can be undesirably large in cases of small records, and further exacerbated by larger sector sizes.

Yet another CKD record to FBA record format conversion involves storing the count and key areas of the CKD records in one area or table of the FBA device (and copying such table to electronic memory for improving read response time), and storing the data fields contiguously in the remaining sectors of the device. The tables in memory can then be used to more quickly determine the location of data field. Additionally, the data fields can be stored efficiently since they are stored contiguously. A drawback of the described conversion is that in cases of very large numbers of records, increasingly larger electronic memories for storing the tables are required.

Given that the size of data records often vary from one computer application to another (e.g., employee records may be relatively small and graphical image records may be relatively large), and the sector sizes from one FBA device to another can vary (e.g., from 512 bytes to 2048 bytes or more), and the number of records stored in a database vary substantially, mapping all types of records in a single format regardless of record or sector size does not provide optimum conversion for the different environments.

Accordingly it is desired to provide a method and storage system for fuzzy mapping CKD records to a FBA architecture such that storage space is efficiently used and system response time for staging such records is improved.

SUMMARY OF THE INVENTION

An object of the present invention is to provide an apparatus and method for improved mapping of count-key-data (CKD) records to a fixed-block architecture (FBA) storage device.

According to a first embodiment of the present invention, a method for fuzzy packing CKD records to a FBA storage device is provided, such that some CKD records are packed and other CKD records are unpacked. The fuzzy packing method comprises the steps of: (a) packing a current CKD record starting at a first byte available in a current sector if the current CKD record will fit entirely within a remaining available area of the current sector; (b) packing the current CKD record starting at the first byte available in the current sector and spanning the current CKD record across one or more additional sectors if a size of the current CKD record will span a predetermined number of sectors; and (c) writing the current CKD record starting at a beginning of a next available sector if the current CKD record will span more than a predetermined number of sectors.

In another embodiment of the present invention, a data storage system for receiving and fuzzy packing count-key-data (CKD) records into a fixed-block architecture (FBA) format is provided. The data storage system comprises a direct access storage device (DASD) logically divided into sectors for storing records at cylindrically addressable locations, the DASD being coupled to a controller, wherein the controller receives the CKD records and responds to host commands for mapping the CKD records. A control store holds instructions for directing the controller to map a current CKD record to the DASD in a packed format if the current CKD record can be stored, starting at a currently available addressable location using fewer sectors than if the current CKD record is stored in an unpacked format, otherwise mapping the current CKD record in the unpacked format starting at a next available sector.

The foregoing and other objects, features, and advantages of the invention will be apparent from the following more particular description of a preferred embodiment of the invention, as illustrated in the accompanying drawing.

DETAILED DESCRIPTION

Figure 1:
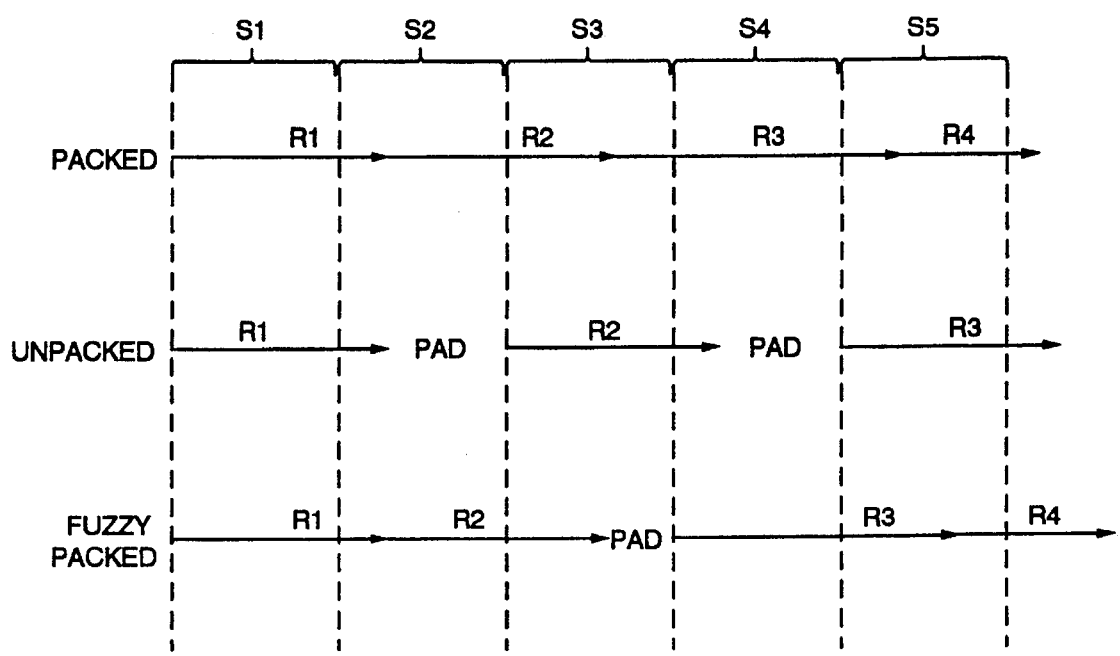
FIG. 1 is a mapping diagram comparing fully packed, fully unpacked, and fuzzy packed CKD records on an FBA device in accordance with a preferred embodiment of the present invention.

Referring now to FIG. 1, a mapping diagram illustrates packed, unpacked, and fuzzy packed count-key-data (CKD) to fixed-block architecture (FBA) mapping. Each disk of an FBA device (not shown), for example, as may be provided in a magnetic disk drive, has each disk not only divided into concentric tracks, but further divided into sectors. Several hundred or thousands of sectors can exist on a single side of a disk. Each sector is capable of storing a predetermined number of bytes, typically 512 of bytes, but the number of bytes per sector can vary. For purposes of illustration, Sectors one through five are shown in FIG. 1.

Fully packing the CKD records, R1–R4, results in each record being written at a location where the preceding record ended. As can be seen, fully packing CKD records most efficiently uses space on the FBA device. A performance drawback occurs, however, when trying to read record R3 because most of sector S3 has to be read to find the beginning of record R3 even though only a small portion of record R3 exists in sector S3. A trend of increasing sector sizes from the current 512 byte size exits, and system time wasted reading undesired portions of sectors will increase accordingly. Thus fully packing CKD records to FBA devices becomes less desirable with larger sector sizes.

Storing records fully unpacked results in inefficient record packing, but provides improved staging efficiency.

Continuing with the current example in FIG. 1, only records R1–R3 can be written to sectors S1–S5 since each record is written starting at a beginning of a sector (note that in this instance record R3 uses two sectors, whereas fully packed record R3 requires three sectors). Hence, system time is not wasted reading portions of sectors not containing the desired record. The unused portion of a sector following a record is filled with pad ("zeros" are written to the end of the sector). Inefficiency of the fully unpacked records is more extreme given smaller records and larger sectors sizes.

Fuzzy record packing takes into account record size, sector size, and the amount of space available in a current sector to determine whether to pack the record or store the record unpacked for the best tradeoffs between packing density and system response time. In FIG. 1, using fuzzy packing, records R1–R4 use the same number of sectors as the packed format (though this may not hold true for an entire disk), and two of the four records begin at sector boundaries. For best system response time and packing density tradeoffs, a record should be started at a new sector boundary if a large portion of a previous sector would have to be read to retrieve the record (such as with record R3). Conversely, a CKD record should be packed if a large portion of the previous record would otherwise by padded or wasted, or stated in the alternative, only a small portion of the sector would contain a previous record (such as with record R2). The placement of records, determined during format operations, should be fast in order to deal with large numbers of records without undue processing overhead.

Figure 2:
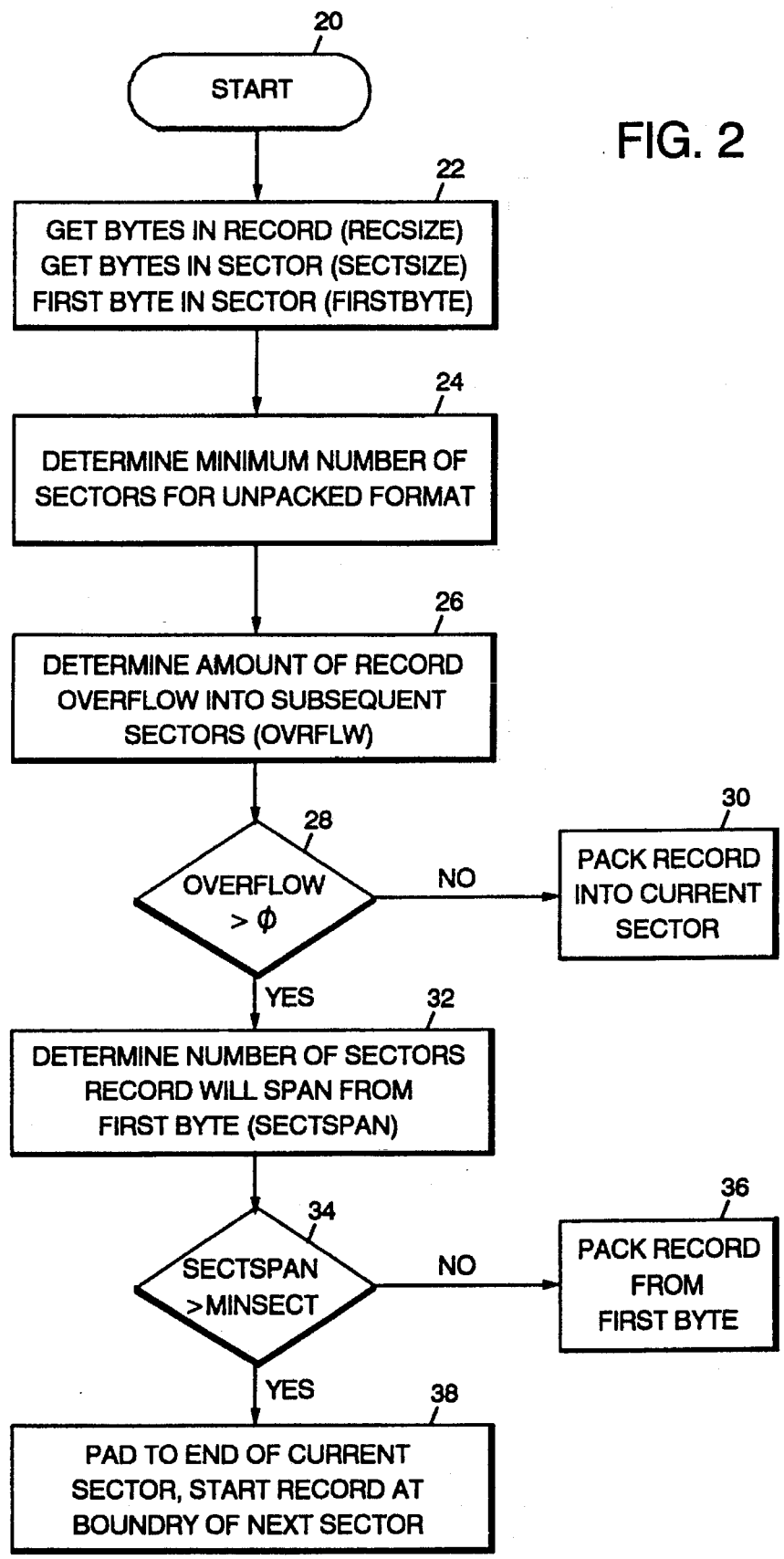
FIG. 2 is a flow diagram of a method for fuzzy packing CKD records to FBA device in accordance with a preferred embodiment of the present invention.

FIG. 2 diagrams steps taken to fuzzy pack CKD records on an FBA device. Fuzzy packing starts at step 20 when a CKD record is identified to be mapped to an FBA device. At step 22 that information needed to make the mapping determination is retrieved, including getting a number of bytes that make up the CKD record (RecSize), getting a number of bytes that make up each sector of the FBA device (SectSize), and getting a next available location of the current sector (the end of the last record) where the CKD record would be written if packed (FirstByte).

Step 24 involves determining how many sectors would be required to write the current CKD record if the current CKD record is written unpacked (this is the fewest sectors that the current CKD record could physically be written to, MinSect). MinSect is calculated as:

$$MinSect = Integer(RecSize/SectSize) \quad \text{Eq. 1}$$

As an example, given a RecSize of 600 bytes and a Sectsize of 512 bytes, then Minsect is equal to Integer(600/512) or 2. The "Integer" command can be accomplished, for example, by truncating the value returned from within the parentheses and incrementing (i.e., rounding up to the next integer value).

At step 26, whether the current CKD record will fit into a remaining portion of a current sector or whether the current CKD record will overflow into an adjacent sector is determined. The Amount of overflow, OvrFlw, is determined as:

$$OvrFlw = RecSize - (SectSize - FirstByte) \quad \text{Eq. 2}$$

Eq. 2 has two parts, first, a remaining area of a current sector, or pad, is determined simply as SectSize–FirstByte. If the current CKD record is smaller than the pad, OvrFlw will return a negative result (no overflow) and the CKD record, in its entirety, can be written in the remaining area of the current sector. If, on the other hand, the pad is smaller than the current CKD record, OvrFlw will return a positive result, and the current CKD record will not fit entirely within the current sector.

The OvrFlw value determined at step 26 is tested at step 28 to determine whether to pack the current CKD record. If OvrFlw is negative, or less than zero, then at step 30 the current CKD record is packed starting at FirstByte of the current sector, and no further processing of the current CKD record is required for fuzzy packing purposes and a next CKD record can be assessed (starting again at step 20). If OvrFlw is positive, or greater than zero, the process continues on to step 32.

Step 32 includes determining a number of sectors the current CKD record will span if written starting at the first available byte of the current sector, SectSpan. SectSpan is determined as:

$$SectSpan = Integer(OvrFlw/SectSize) + 1 \quad \text{Eq. 3}$$

SectSpan thus returns the number of sectors, including the remaining portion of the current sector as one sector, and that portion of a last sector, required for storing the current CKD record. For example, given 512 byte sectors, and an OvrFlw of 700, then three sectors would be required to store the current CKD record if packed (the remaining portion of the current sector (increment portion of Eq. 3), 512 bytes of the next sector, and 188 bytes of a last sector (rounded up to the next integer)).

Step 34 compares a magnitude of SectSpan to a magnitude of MinSect. If SectSpan is equal to MinSect, then the current CKD record can be stored more effectively by packing starting at FirstByte and step 36 packs the current CKD record. When SectSpan is greater than MinSect, it is more effective to map the current CKD record unpacked and thus step 38 will be performed for padding the current sector and writing the current CKD record at the beginning of the next sector.

The following examples illustrate the fuzzy packing method. Assume that SectSize equals 1024 bytes, and FirstByte=777. Given a RecSize equal to 100 bytes:

$$MinSect = Integer(100/1024) = 1;$$

$$OvrFlw = (100 - (1024 - 777)) = Negative.$$

Result: pack current CKD record into a remaining portion of the current sector.
Given a RecSize equal to 500 bytes:

$$MinSect = Integer(500/1024) = 1;$$

$$SectSpan = Integer((500 - (1024 - 777))/1024) + 1 = 2.$$

Result: SectSpan>MinSect, map unpacked.
Given a RecSize equal to 1000 bytes:

$$MinSect = Integer(1000/1024) = 1;$$

$$SectSpan = Integer((1000 - (1024 - 777))/1024) + 1 = 2;$$

Result: SectSpan>MinSect, map unpacked.
Given a RecSize equal to 1100 bytes:

$$MinSect = Integer(1100/1024) = 2;$$

$$SectSpan = Integer((1100 - (1024 - 777))/1024) + 1 = 2;$$

Result: SectSpan equal to MinSect, pack.
Given a RecSize equal to 2000 bytes:

$$Minsect = Integer(2000/1024) = 2;$$

$$SectSpan = Integer((2000 - (1024 - 777))/1024) = 3;$$

Result: SectSpan>MinSect, map unpacked.

Figure 3:
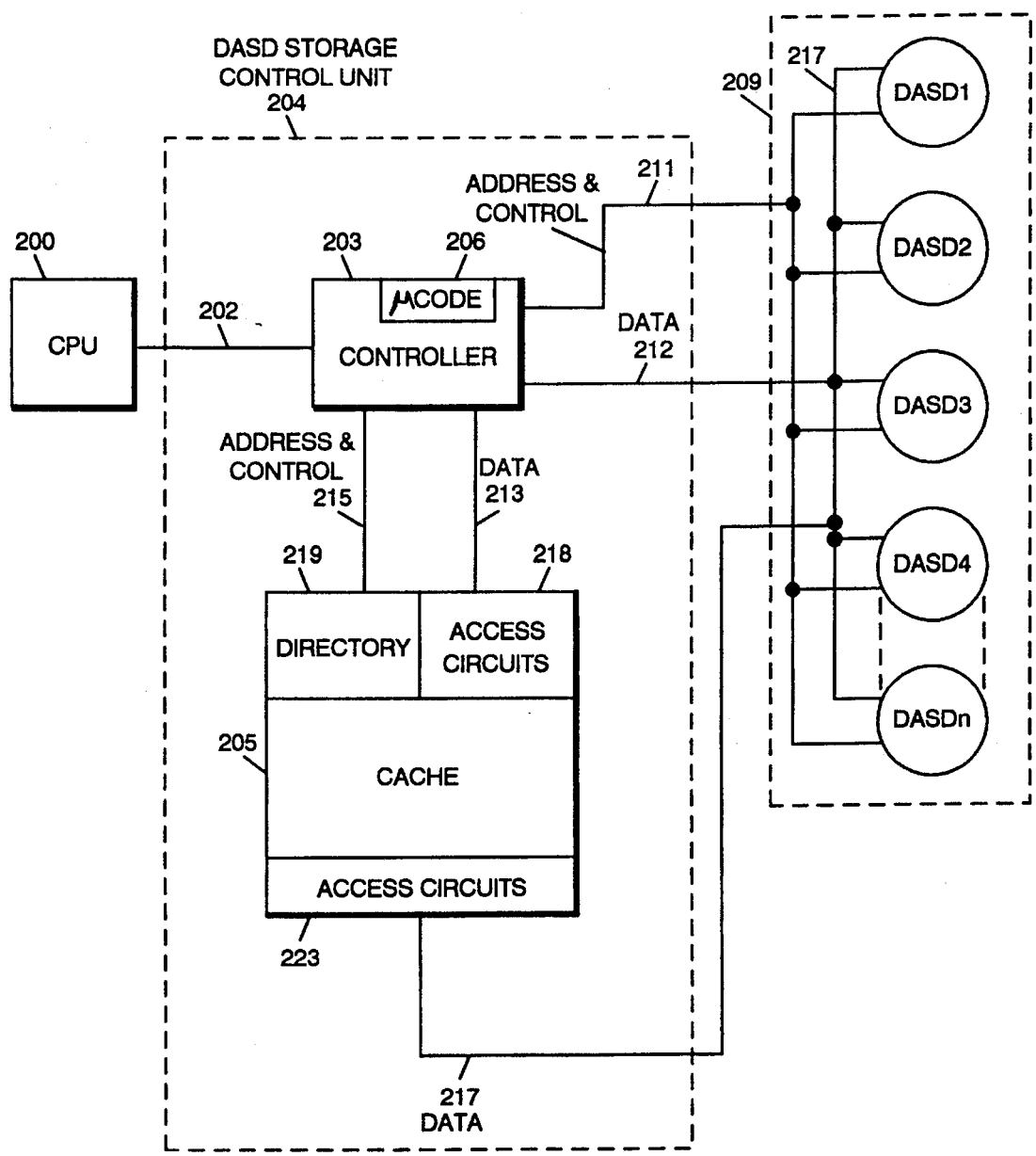
FIG. 3 is a block diagram of a storage system for fuzzy packing CKD records to an FBA DASD in accordance with a preferred embodiment of the present invention.

Referring now to FIG. 3, a block diagram depicts a storage system for carrying out an embodiment of the present invention. A host processor or central processing unit (CPU) 200, for example an IBM system/360 or system/370, operating on an IBM multiple virtual storage (MVS) operating system, provides general data processing as is well known. The CPU 200 sends host commands or chains of channel command words (CCWs) via a channel 202 to a direct access storage device (DASD) storage control unit 204 for interpretation therein. A plurality of DASDs 209, coupled to the CPU 200 by the DASD storage control unit 204, provide the large storage space necessary for record storage and accessible to the CPU 200. Although the DASD storage control unit 204 is shown separately from the plurality of DASDs 209, it is known that the DASD storage control unit 204 can be an integral part of the DASDs 209, as in a DASD drawer for example. Furthermore, the DASDs 209 may be arranged in many different configurations, including a redundant array of inexpensive devices (RAID) configuration, as is known in the art. Several configuration variations of RAID may be used in the present invention without departing from the teachings herein.

The CPU 200 establishes communication with the DASDs 209 by issuing a START I/O instruction for connecting to an addressed DASD device(s) and starting a channel program within the device(s). Thereafter, control is under the CCWs sent over the channel 202, wherein the CCWs are interpreted by a controller 203 for selecting and accessing the DASDs 209 via the controller 203, directory 219, cache 205, access circuits 218 and 223, and address and control paths 211 and 215. Data stored in, or to be stored in, the DASDs 209 is thus moved to and from the CPU 200 by the controller 203, cache 205 and data path 217, or by the controller 203 and a data path 212.

Each channel program includes a sequential list of operations residing in CPU 200 main memory (not shown). Transmission to and execution at the DASD storage control unit 204 of CCWs occurs only after initial connection between the CPU 200 and the DASD storage control unit 204 takes place. For each operation in the channel program, one or more counterpart operations are required either at the DASD storage control unit 204 or at the DASDs 209 device level over an active connection. The CCW sequence need not be continuous but may be segmented. Some CCWs, for example, SEEK and SET SECTOR, allow the DASD storage control unit 204 to operate while electronically disconnected from the CPU 200 while a DASD access mechanism positions over a track and the disk rotates the desired sector over the access mechanism. A READ CCW would require a path connection between the DASD storage control unit 204 and the CPU 200 to transfer data therebetween.

The controller 203 performs many data or record manipulation functions, for example, data may be read from the CPU 200 over the channel in bytes, and the controller 209 then serializes that data into bit streams for transmission to the DASDs 209 and vice versa. When a CKD record is received by the controller 203, that CKD record is analyzed in the controller 203 for mapping the CKD record to the DASDs 209. In one scenario, microcode comprising instructions for instructing the fuzzy packing of CKD records may initially be stored in the DASDs 209 and loaded into control store 206 located in the controller 203 at initial microcode load (IML). Alternatively, the fuzzy mapping microcode could be loaded from another source, resident in the controller 203, or take the form of firmware.

The microcode, once in the controller 203, provides the directions necessary for mapping CKD records received at the controller 203 for storage onto the DASDs 209 according to the present invention. The controller 203 determines the RecSize of the received CKD record and gets the FirstByte and SectSize from the DASDs 209 (and/or directory 219). The mapped CKD records may move to and from the DASDs 209 directly via data bus 212, or through electronic memory such as the cache 205 (or through non-volatile memory).

Mapping the CKD records, though following the general form of mapping according to the relationship of RecSize, FirstByte, SectSize, and MinSect, can vary in several respects. For example, the entire CKD record can be considered and used for determining RecSize, and then contiguously written to the DASDs 209. Alternatively, the count and/or key portions of the CKD record can be considered separately from the data portion, and may be written to separate portions of the DASDs 209 relative to the data portions. Such count and key fields could be written to electronic memory for faster access to the data.

Also, the order of steps performed may vary according to the relationship of record size to sector size. For example, if it is known that the records are small relative to the sector size, then performing the overflow determination may be done before determining MinSect since many records will be packed. Alternatively, the order of calculations for record mapping may be adjusted continuously by statistically tracking recent packed to unpacked ratios.

In summary, a storage system is coupled to a host processor by a channel such that the storage system receives commands and CKD records from the host processor for mapping the CKD records in a fixed-block architecture (FBA) format, wherein a current CKD record is assessed to determine whether to map the current CKD record as a packed or unpacked record. The storage system includes a direct access storage device (DASD) logically divided into sectors for storing records at cylindrically addressable locations. A controller receives the CKD records and responds to host commands for staging the CKD records. A cache memory is coupled between the DASD and the controller for moving records therebetween. A control store receives CKD record mapping microcode instructions at initial microcode load (IML), wherein the microcode instructions direct the controller to: (a) determine a next available starting location for mapping the current CKD record to the DASD; (b) determine a record size of the current CKD record; (c) determine a minimum number of sectors required to pack the current CKD record; (d) determine a number of sectors the current CKD record will span if mapped unpacked; and (e) mapping the current CKD record packed if packing the current CKD record spans fewer sectors than if the current CKD record is packed, otherwise padding a remaining area of the current sector and mapping the current CKD record unpacked.

While the invention has been particularly shown and described with reference to preferred embodiments thereof, it will be understood by those skilled in the art that various changes in form and details may be made therein without departing from the spirit and scope of the invention. A single embodiment of the fuzzy mapping of CKD records to FBA devices has been set forth herein, but variations can be made without departing from the invention set forth. The particular CPU or controller may be chosen and used without departing from the invention set forth. Similarly, the particular form of the CKD records or the FBA device can vary. For example, the number of bytes per sector can vary without departing from the teachings herein.

What is claimed is:

1. In a controller, a method for mapping count-key-data records to a fixed-block architecture DASD, wherein the DASD includes a storage medium having a predetermined number of sectors, each sector capable of storing a predetermined number of bytes (SectSize), the method comprising steps of:

(a) determining a record size of a current count-key-data record to be written to the DASD, RecSize;

(b) determining a next available starting location for writing data in a current sector, FirstByte;

(c) determining a minimum number of sectors required to write the current count-key-data record, MinSect;

(d) determining a number of sectors the current count-key-data record will span if the current count-key-data record is written starting at the FirstByte position, SectSpan;

(e) determining a pad size of the current sector by subtracting FirstByte from SectSize; and (f) writing the current count-key-data record to the DASD starting at FirstByte in the current sector if a magnitude of SectSpan is equal to a magnitude of MinSect or if a magnitude of RecSize is less than or equal to the pad size, otherwise writing the current record to the DASD starting at a next available sector and padding the current sector starting at FirstByte.

2. The method according to claim 1 wherein the step (c) of determining MinSect is calculated by dividing RecSize by the SectSize and rounding up to a next integer value.

3. The method according to claim 2 wherein the step (d) of determining SectSpan is calculated by subtracting the pad size from RecSize and dividing the result by the SectSize and incrementing.

4. The method according to claim 3 wherein count, key, and data portions of the count-key-data record are written contiguously.

* * * * *